219-121

1/28/86

SR

XR 4,566,936

United States Patent [19]

Bowlin

[11] Patent Number: 4,566,936

[45] Date of Patent: Jan. 28, 1986

[54] METHOD OF TRIMMING PRECISION RESISTORS

[75] Inventor: Stanley L. Bowlin, Weatherford, Tex.

[73] Assignee: North American Philips Corporation, New York, N.Y.

[21] Appl. No.: 668,443

[22] Filed: Nov. 5, 1984

[51] Int. Cl.[4] ........................ B23K 9/00; H01C 10/00; B44C 1/22; C23F 1/02

[52] U.S. Cl. .................................... 156/627; 156/643; 156/655; 156/656; 156/667; 219/121 LJ; 219/121 LM; 338/195; 427/53.1; 427/102

[58] Field of Search .................. 219/121 LH, 121 LJ, 219/121 LM; 156/627, 643, 655, 656, 667; 427/53.1, 102; 338/195

[56] References Cited

U.S. PATENT DOCUMENTS 3,916,144 10/1975 Schuermann .................. 219/121 LJ

*Primary Examiner*—William A. Powell
*Attorney, Agent, or Firm*—Thomas A. Briody; William J. Streeter; Edward W. Goodman

[57] ABSTRACT

A method for trimming precision resistors which includes forming a helical groove in a conductive film coating on a cylindrical core. Final trimming includes forming discrete circular depressions in the film coating by using a pulsed laser. This method enables the manufacture of precision resistors having a tolerance of 0.25% or better.

7 Claims, 4 Drawing Figures

METHOD OF TRIMMING PRECISION RESISTORS

BACKGROUND OF THE INVENTION

The invention relates to a method of trimming precision resistors, which resistors each include an insulating core coated with a suitable conductive film, end caps or other terminations being applied thereto.

A known method of trimming the above resistors includes cutting slots or grooves into the surface thereof which increases the resistance through the resistor by extending the resistance path. This method is generally effective for trimming precision resistors to within 0.5% to 1.0% of a specified electrical resistance.

However, when greater precision is desired, for example 0.25% tolerance or better, it becomes exceedingly difficult to accurately find and continue the original groove and to accurately control the length of the groove so that the final resistance through the resistor is within the desired tolerance of the specified resistance without overshooting the specified resistance. It should be noted that the known methods of trimming precision resistors only increase the resistance through the resistors and that once the specified resistance is exceeded, there is no practical way to reduce the resistance through the resistor.

SUMMARY OF THE INVENTION

The object of this invention is to provide a high-yield method of trimming precision resistors to within very close tolerances of a specified electrical resistance.

This object is achieved in a method of trimming precision resistors, wherein the method includes the steps:

forming a helical groove in a surface of the resistor to increase the electrical resistance therethrough so that the electrical resistance is within a first tolerance below a desired electrical resistance, forming small discrete depressions in the surface of the resistor to further increase the electrical resistance therethrough, measuring the electrical resistance of the resistor during the forming of the small discrete depressions, and terminating the forming of the small discrete depressions when the electrical resistance through the resistor is within a second tolerance of the desired electrical resistance.

Using the above method, precision resistors may be trimmed to within 0.25% tolerance or better of a specified electrical resistance.

While there are numerous methods for forming the small discrete depressions, it is advantageous to use a Q switched laser which is set to a low pulse rate.

DESCRIPTION OF THE DRAWING

With the above and additional objects and advantages in mind as will hereinafter, the invention will be described with reference to the accompanying drawing, in which.

DESCRIPTION OF THE PREFERRED EMBODIMENT

Figure 1:
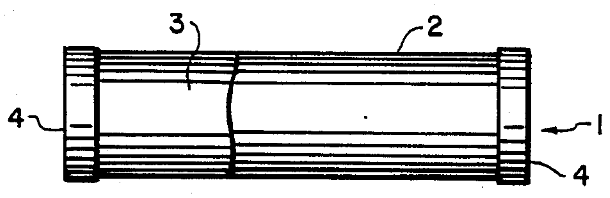
FIG. 1 shows a precision resistor prior to trimming.

A precision resistor 1 is shown in FIG. 1 prior to trimming. It should be noted that the FIGS. 1–4 are not drawn to scale and are for illustration only. This precision resistor 1 is formed by coating a cylindrical core 2 with a compatible conductive film 3 whose electrical resistive characteristics are known. Suitable materials for the core 2 and the film 3 are, for example, glass or ceramic for the core 2 and nichrome alloy, tin oxide or tantalum nitride for the film 3. After applying end caps 4 to the ends of the film-coated core 2, the precision resistor 1 is then ready for initial trimming.

Figure 2:
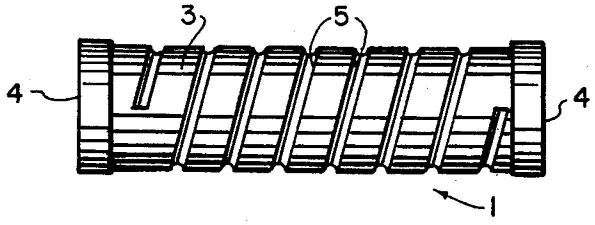
FIG. 2 shows a precision resistor after initial trimming and before final trimming.

Referring to FIG. 2, a helical groove or slot 5 is cut into the film coating 3 by any suitable means, for example laser or abrasive wheel, to increase the electrical resistance through the resistor by extending the resistance path. The electrical resistance is monitored and when the electrical resistance is within 0.5% to 1.0% tolerance of a specified electrical resistance, this cutting process is terminated.

The grooved precision resistor 1 is then stabilized by baking, for example at 185° C. for four hours.

Figure 3:
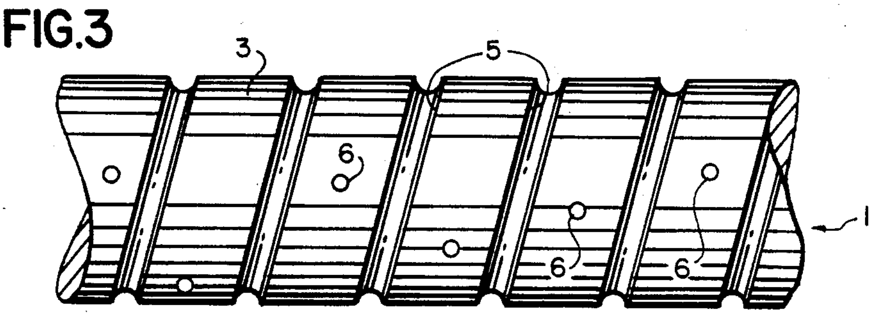
FIG. 3 shows an enlarged section of a precision resistor after final trimming.
Figure 4:
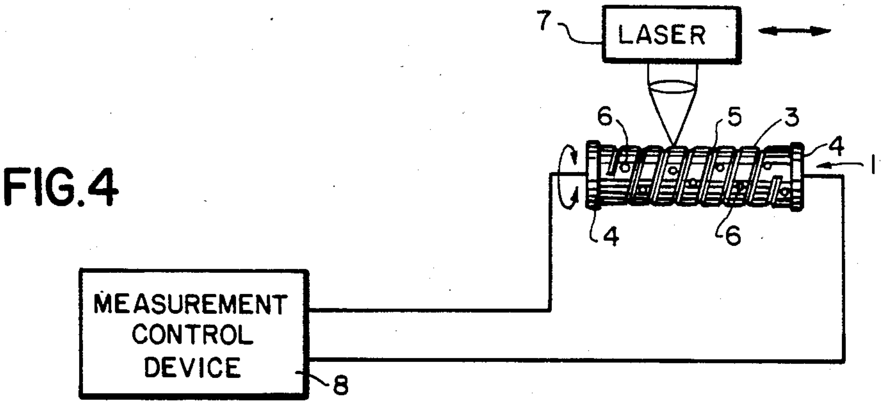
FIG. 4 shows an arrangement for performing the final trimming.

After stabilization, the precision resistor 1 is final trimmed by forming small discrete depressions 6, as shown in FIG. 3. These depressions 6, which may be elliptical or circular, incrementally increase the electrical resistance through the resistor 1 in small amounts thereby enabling the attainment of tolerances of 0.25% or better.

The invention proposes forming the depressions 6 using a Q switched laser 7 (see FIG. 4) which is pulsed at a low pulse rate, for example a few hundred to a few thousand pulses per second, and is focused to produce a 0.001" diameter spot so that the film coating 3 is locally vaporized. This laser 7 is scanned along the length of the resistor 1 while, at the same time, the resistor 1 is rotated. During this trimming operation, the electrical resistance through the resistor 1 is monitored in a precision resistance measuring and control device 8 having means for entering the specified electrical resistance along with the desired tolerance. Once the specified electrical resistance is reached, the device 8 supplies a control signal to the laser 7 for terminating the operation thereof.

After the above final trimming process, leads are welded onto the resistor 1 and the resistor 1 is then finished in accordance with customary procedures.

Numerous alternations of the structure herein disclosed will suggest themselves to those skilled in the art. However, it is to be understood that the present disclosure relates to a preferred embodiment which is for purposes of illustration only and not to be construed as a limitation of the invention. All such modifications which do not depart from the spirit of the invention are intended to be included within the scope of the appended claims.

What I claim:

1. A method for trimming precision resistors, wherein a resistive film is deposited onto a substrate compatible with said film, said method comprising the steps:

forming a helical groove in a surface of said resistor to increase the electrical resistance therethrough so that said electrical resistance is within a first tolerance below a desired electrical resistance;

forming small discrete depressions in the surface of said resistor to further increase the electrical resistance therethrough;

measuring the electrical resistance of said resistor during the forming of said small discrete depressions; and terminating the forming of said small discrete depressions when the electrical resistance through said resistor is within a second tolerance of said desired electrical resistance.

2. The method as set forth in claim 1, wherein said first tolerance is 0.5% to 1.0%.

3. The method as set forth in claim 1, wherein said second tolerance is 0.25% or less.

4. The method as set forth in claim 1, wherein said small discrete depressions are formed by a Q switched laser which locally vaporizes said film.

5. The method as set forth in claim 4, wherein said resistor is rotated while said laser is scanned across the surface thereof.

6. The method as set forth in claim 1, wherein said terminating step is performed automatically when said electrical resistance through said resistor is within said second tolerance of said desired electrical resistance.

7. The method as set forth in claim 1, wherein said method further comprises the step of baking said resistor for stabilization after forming said helical groove and before forming said small discrete depressions.

* * * * *